US009562165B2

(12) United States Patent
Mori et al.

(10) Patent No.: US 9,562,165 B2
(45) Date of Patent: Feb. 7, 2017

(54) INK SET AND INK JET RECORDING METHOD

(71) Applicant: CANON KABUSHIKI KAISHA, Tokyo (JP)

(72) Inventors: Yasuhito Mori, Kawasaki (JP); Tomohiro Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/558,979

(22) Filed: Dec. 3, 2014

(65) Prior Publication Data

US 2015/0184008 A1 Jul. 2, 2015

(30) Foreign Application Priority Data

Dec. 27, 2013 (JP) ................................ 2013-272237

(51) Int. Cl.

| | |
|---|---|
| ***G01D 11/00*** | (2006.01) |
| ***C09D 11/322*** | (2014.01) |
| ***C08K 5/23*** | (2006.01) |
| ***C08K 5/3417*** | (2006.01) |
| ***C08K 5/3437*** | (2006.01) |
| ***C09D 11/40*** | (2014.01) |

(52) U.S. Cl.

CPC ............... *C09D 11/322* (2013.01); *C08K 5/23* (2013.01); *C08K 5/3417* (2013.01); *C08K 5/3437* (2013.01); *C09D 11/40* (2013.01)

(58) Field of Classification Search

CPC ............... B41J 2/01; B41J 2/0057; B41J 2/05; B41J 2/1433; B41J 2/15; B41J 2/155; B41J 2/17; B41J 2/1755; B41J 2/17503; B41J 2/17593; B41J 2/21; B41J 2/211; B41J 2/2107; B41J 2/2114; B41J 2/2117; B41J 2/2056; C09D 11/005; C09D 11/30; C09D 11/32; C09D 11/322; C09D 11/324; C09D 11/328; C09D 11/36; C09D 11/38; C09D 11/40; C09D 11/52; C09D 11/54; C09D 11/101

USPC ... 347/9–22, 56, 86, 88, 95–105; 106/31.13, 106/31.27, 31.6, 31.65, 31.85, 31.77, 106/31.75

See application file for complete search history.

(56) References Cited

U.S. PATENT DOCUMENTS

| | | | | |
|---|---|---|---|---|
| 7,160,372 | B2 | 1/2007 | Yoshizawa et al. | |
| 7,226,498 | B2 | 6/2007 | Yamashita et al. | |
| 7,247,194 | B2 | 7/2007 | Okamura et al. | |
| 7,270,701 | B2 | 9/2007 | Jinnou et al. | |
| 7,276,112 | B2 | 10/2007 | Tokuda et al. | |
| 7,297,197 | B2 | 11/2007 | Jinnou et al. | |
| 7,550,037 | B2 | 6/2009 | Mafune et al. | |
| 7,611,571 | B2 | 11/2009 | Yamashita et al. | |
| 8,075,126 | B2 | 12/2011 | Yoshizawa et al. | |
| 8,393,726 | B2 | 3/2013 | Moribe et al. | |
| 8,616,695 | B2 | 12/2013 | Mori et al. | |
| 8,783,843 | B2 | 7/2014 | Moribe et al. | |
| 8,858,695 | B2 | 10/2014 | Gu et al. | |
| 2005/0012796 | A1* | 1/2005 | Doi | C09D 11/30 347/100 |
| 2006/0100311 | A1* | 5/2006 | Tokuda | C09D 11/326 523/160 |
| 2007/0100024 | A1 | 5/2007 | Gu et al. | |
| 2007/0225403 | A1 | 9/2007 | Lee | |
| 2009/0192261 | A1 | 7/2009 | Anton | |
| 2012/0026240 | A1* | 2/2012 | Saito | C09B 67/0013 347/21 |
| 2012/0033009 | A1* | 2/2012 | Gouda | C09C 1/56 347/20 |
| 2012/0033012 | A1* | 2/2012 | Nagai | C09D 11/324 347/29 |
| 2012/0268532 | A1* | 10/2012 | Mori | C09D 11/326 347/56 |
| 2013/0027476 | A1 | 1/2013 | Mori et al. | |

FOREIGN PATENT DOCUMENTS

| | | | |
|---|---|---|---|
| CN | 1977004 | A | 6/2007 |
| CN | 101200609 | A | 6/2008 |
| CN | 101379143 | A | 3/2009 |
| EP | 1 153 992 | A1 | 11/2001 |
| JP | 2001-081378 | A | 3/2001 |
| JP | 2009-515007 | A | 4/2009 |
| JP | 2013-063604 | A | 4/2013 |

OTHER PUBLICATIONS

May 26, 2016 Chinese Official Action in Chinese Patent Appln. No. 201410818015.9.

* cited by examiner

*Primary Examiner* — Erica Lin

(74) *Attorney, Agent, or Firm* — Fitzpatrick, Cella, Harper & Scinto

(57) ABSTRACT

An ink jet ink set including three aqueous inks of a cyan ink, a magenta ink and a yellow ink, wherein any two inks of the cyan ink, the magenta ink and the yellow ink are inks satisfying the following condition A, and the other ink is an ink satisfying the following condition B:

Condition A: an ink containing a first self-dispersible pigment having a functional group that contains a phosphonic acid group and another atomic group and is bonded to a particle surface of the pigment; and Condition B: an ink containing a second self-dispersible pigment having a functional group that contains at least one of a sulfonic acid group and a carboxylic acid group and is bonded to a particle surface of the pigment.

20 Claims, No Drawings

INK SET AND INK JET RECORDING METHOD

BACKGROUND OF THE INVENTION

Field of the Invention

The present invention relates to an ink set and an ink jet recording method using the same.

Description of the Related Art

According to an ink jet recording method, an image can be recorded (formed) on various recording media. Various inks corresponding to purposes, for example, an ink suitable for recording an image of photographic image quality on glossy paper and an ink suitable for recording a document on plain paper, have been proposed to intend better image formation. In recent years, the ink jet recording method has been utilized even in printing of a business document including characters and figures using plain paper as a recording medium, thereby increasing the frequency of its use dramatically. Therefore, the use of a pigment as a coloring material not only in a black ink but also in a color ink increases to obtain an ink suitable for recording characters and figures on a recording medium such as plain paper.

In the ink jet recording method, a general color image is recorded with three inks of a cyan ink, a magenta ink and a yellow ink, which are inks of primary colors of subtractive color mixture. What is called special (spot) color inks such as a black ink, a red ink, a green ink and a blue ink are used in addition to these inks as needed.

An image recorded with a color ink using a pigment as a coloring material involves a problem that its color developability is inferior compared with an image recorded with a color ink using a dye as a coloring material. A great number of methods for solving such a problem have been proposed. For example, there is a proposal for improving the characteristics of an image recorded on plain paper by using an ink containing a self-dispersible pigment, which is dispersible without using a dispersant, and a specific salt (Japanese Patent Application Laid-Open No. 2001-081378). In addition, there is also a proposal for improving an optical density of an image recorded by using an ink containing a self-dispersible pigment to which a functional group high in reactivity to calcium has been bonded on the basis of a calcium index which is an index of reactivity to calcium (Japanese Patent Application Laid-Open No. 2009-515007 through PCT route).

SUMMARY OF THE INVENTION

While referring to the above prior art documents, the present inventors have carried out an investigation with a view toward improving the color developability of a color image recorded with an ink set constituted of three inks of a cyan ink, a magenta ink and a yellow ink which each contain a self-dispersible pigment. As a result, it has been found that when such a self-dispersible pigment as proposed in Japanese Patent Application Laid-Open Nos. 2001-081378 or 2009-515007 is used as a coloring material of an ink, a color image whose color developability has been somewhat improved can be recorded. However, when recording is conducted with a plurality of color inks, it has been confirmed that an unnecessary ink aggregates caused by recovery operations such as preliminary ejection, suction recovery or pressurization recovery which are required for the ink jet recording method easily deposit. It has been found that when the recording is continued, the deposited aggregates adheres to and deposits on a recording head and a recording medium to cause such a phenomenon of “irregular ejection” that the ejecting direction of an ink droplet is deviated or to stain the recording medium or the interior of a recording apparatus.

Accordingly, it is an object of the present invention to provide an ink set of primary colors by which an image excellent in color developability can be recorded, and by which the deposition of an unnecessary ink aggregates is inhibited even when a recovery operation is conducted. Another object of the present invention is to provide an ink jet recording method using the above ink set.

The above objects are achieved by the following present invention. According to the present invention, there is thus provided an ink jet ink set including three aqueous inks of a cyan ink, a magenta ink and a yellow ink, wherein any two inks of the cyan ink, the magenta ink and the yellow ink are inks satisfying the following condition A, and the other ink is an ink satisfying the following condition B:

Condition A: an ink containing a first self-dispersible pigment having a functional group that contains a phosphonic acid group and another atomic group and is bonded to a particle surface of the pigment; and Condition B: an ink containing a second self-dispersible pigment having a functional group that contains at least one of a sulfonic acid group and a carboxylic acid group and is bonded to a particle surface of the pigment.

According to the present invention, there can be provided an ink set of primary colors by which an image excellent in color developability can be recorded, and by which the deposition of an unnecessary ink aggregates is inhibited even when a recovery operation is conducted. According to the present invention, there can also be provided an ink jet recording method using this ink set.

Further features of the present invention will become apparent from the following description of exemplary embodiments.

DESCRIPTION OF THE EMBODIMENTS

The present invention will now be described in detail by preferred embodiments. However, the present invention is not limited to the following embodiments. Incidentally, the aqueous ink may be referred to as “an ink” merely. Various physical property values in the present specification are values at ordinary temperature (25° C.) unless expressly noted.

The cause of generation of aggregates of unnecessary ink (hereinafter referred to as “an unnecessary ink”) which is caused by recovery operations such as preliminary ejection, suction recovery or pressurization recovery deposits is first considered. Even when an image is recorded with only one of the inks respectively containing the self-dispersible pigments proposed in Japanese Patent Application Laid-Open Nos. 2001-081378 and 2009-515007, the amount of unnecessary ink discharged is small, and so aggregates do not deposit. When the amount of the unnecessary ink discharged is small, most of the unnecessary ink discharged promptly permeates into a member (absorbing member) for absorbing the unnecessary ink. Therefore, it is considered that aggregates of the unnecessary ink gradually occur from the interior of the absorbing member. In addition, even when the aggregates occur, the amount of the aggregates deposited is also small because the absolute amount of the unnecessary ink discharged is small, and so it is inferred that irregular ejection does not occur.

On the other hand, when plural inks respectively containing the self-dispersible pigments proposed in Japanese Patent Application Laid-Open Nos. 2001-081378 and 2009-515007 are used in combination to record an image, the amount of unnecessary ink discharged increases, and so aggregates easily deposit. When the amount of the unnecessary ink discharged is large, it takes a time to permeate the whole amount of the unnecessary ink discharged into the absorbing member. Therefore, liquid components in the unnecessary ink evaporate during the permeation, and the pigments aggregates, so that aggregates deposit on the surface of the absorbing member. The aggregates deposited on the surface of the absorbing member prevent subsequently discharged unnecessary ink from permeating into the absorbing member, and so it is considered that the aggregates markedly deposit.

From the above-described cause, the present inventors have considered that in the case of an ink set constituted of plural inks, if the aggregation of the unnecessary ink by the evaporation of the liquid components can be inhibited, the deposition of the aggregates can be inhibited and have carried out a further investigation. As a result, it has been found that an ink set constituted of plural inks including an ink satisfying the following condition A and an ink satisfying the following condition B is provided, whereby the deposition of aggregates of unnecessary ink can be inhibited.

Condition A: an ink containing a first self-dispersible pigment having a functional group that contains a phosphonic acid group and another atomic group and is bonded to a particle surface of the pigment; and Condition B: an ink containing a second self-dispersible pigment having a functional group that contains at least one of a sulfonic acid group and a carboxylic acid group and is bonded to a particle surface of the pigment.

The reason why the deposition of aggregates of unnecessary ink can be inhibited by the above-described ink set that is inferred by the present inventors will now be described. First, the mechanism with which aggregates of unnecessary ink deposit in the case where an ink set constituted of only inks satisfying Condition A and an ink set constituted of only inks satisfying Condition B are used to conduct recording are respectively described.

Mechanism with which aggregates of unnecessary ink of ink satisfying Condition A deposit:

A self-dispersible pigment contained in an ink satisfying Condition A has a functional group containing a phosphonic acid group and another atomic group. Therefore, the self-dispersible pigment contained in the ink satisfying Condition A is high in reactivity to a polyvalent metal such as calcium contained as a filler in a recording medium. In addition, the self-dispersible pigment having such a functional group easily aggregates owing to a pH change of the ink and an increase of concentration of a water-soluble organic solvent attending on evaporation of a liquid components such as water. Accordingly, when liquid components in unnecessary ink in the case of an ink set constituted of only the inks satisfying Condition A evaporate, the self-dispersible pigments promptly aggregates and deposit. From the above, in the case of the ink set constituted of only the inks satisfying Condition A, it is considered that the ink aggregates deposited on the surface of the absorbing member are the cause why irregular ejection easily occurs.

Mechanism with which Deposition of Aggregates of Unnecessary Ink of Ink Satisfying Condition B is Inhibited:

A self-dispersible pigment contained in an ink satisfying Condition B has a functional group containing at least one of a sulfonic acid group and a carboxylic acid group. Therefore, the self-dispersible pigment contained in the ink satisfying Condition B is low in reactivity to the polyvalent metal such as calcium contained as the filler in the recording medium compared with the self-dispersible pigment having the functional group containing the phosphonic acid group and another atomic group. In addition, the aggregation of the self-dispersible pigment having such a functional group slowly progresses compared with the self-dispersible pigment having the functional group containing the phosphonic acid group and another atomic group even when a pH change of the ink and an increase of concentration of a water-soluble organic solvent attending on evaporation of liquid components such as water occur. The reason for this is that the sulfonic acid group or the carboxylic acid group easily retains at least one water molecule as hydration water around it compared with the phosphonic acid group even when the liquid components evaporates. Therefore, an ink set constituted of only the inks satisfying Condition B is hard to deposit aggregates of unnecessary ink compared with the ink set constituted of only the inks satisfying Condition A. From the above, in the case of the ink set constituted of only the inks satisfying Condition B, it is considered that the irregular ejection is hard to occur.

Mechanism with which Deposition of Aggregates of Unnecessary Ink in Ink Set Constituted of Ink Satisfying Condition A and Ink Satisfying Condition B is Inhibited:

With respect to an unnecessary ink in which the ink satisfying Condition A and the ink satisfying Condition B are mixed (hereinafter also referred to as "a mixed unnecessary ink"), it is inferred that the deposition of aggregates is inhibited by such a phenomenon as described below. In "the mixed unnecessary ink", the acidic group (sulfonic acid group or carboxylic acid group) of the self-dispersible pigment contained in the ink satisfying Condition B can retain at least one water molecule as hydration water around it even when the liquid components such as water evaporates. That is, since "the mixed unnecessary ink" easily inhibits the evaporation of the liquid components such as water, immediate deposition of the aggregates by rapid aggregation can be inhibited. As a result, "the mixed unnecessary ink" permeates into the absorbing member, whereby the deposition of the aggregates on the surface of the absorbing member is inhibited. In addition, since the hydration water retained around the sulfonic acid group or the carboxylic acid group is shared with the self-dispersible pigment having the functional group containing the phosphonic acid group and another atomic group, the aggregation thereof is also inhibited. From the above, in the case of the ink set constituted of the ink satisfying Condition A and the ink satisfying Condition B, it is considered that the generation itself of the aggregates is inhibited even when the increase of concentration of the water-soluble organic solvent attending on evaporation of the liquid components such as water occurs.

A cyan ink, a magenta ink and a yellow ink which satisfy Condition A and a cyan ink, a magenta ink and a yellow ink which satisfy Condition B have been prepared in the light of the above results to evaluate a secondary color image recorded with these inks as to color developability. Incidentally, in order to confirm the effect developed by Conditions A and B, other ink components than a coloring material have been made common to one another.

(1) Case where all the three inks are inks satisfying Condition A: The color developability of any secondary color image was at a satisfactory level;

(2) Case where all the three inks are inks satisfying Condition B: The color developability of any secondary color image was insufficient;

(3) Case where one ink is an ink satisfying Condition A, and two inks are inks satisfying Condition B: The color developability of a secondary color image recorded with the two inks satisfying Condition B was insufficient, and the whole color developability was also insufficient;

(4) Case where two inks are inks satisfying Condition A, and one ink is an ink satisfying Condition B: The color developability of any secondary color image was at a satisfactory level, and the whole color developability was also at a satisfactory level.

It has been found from the above that the color developability of the secondary color image recorded with the ink satisfying Condition A and the ink satisfying Condition B is greatly improved compared with the color developability of the secondary color image recorded with the two inks satisfying Condition B. When an image is recorded with the ink satisfying Condition A and the ink satisfying Condition B, it is inferred that the color developability of the secondary color image is improved not only by the reason that the color developability of the image recorded with the ink satisfying Condition A is merely high but also by the following action.

When a secondary color image is recorded with inks satisfying Condition A alone, the self-dispersible pigments each having the functional group containing the phosphonic acid group and another atomic group promptly aggregate owing to their reactions with a polyvalent metal such as calcium contained in a recording medium and evaporation of liquid components. The liquid components and the aggregates in each ink easily cause solid-liquid separation, and thus the viscosity of the liquid components is greatly lowered. Therefore, the self-dispersible pigment having aggregated remains on the surface of the recording medium, and the liquid components promptly permeate into the recording medium. As a result, a secondary color image having high color developability is recorded.

On the other hand, when a secondary color image is recorded with inks satisfying Condition B alone, the self-dispersible pigments in these inks are hard to aggregates compared with the self-dispersible pigment having the functional group containing the phosphonic acid group and another atomic group even when the reactions with the polyvalent metal such as calcium contained in the recording medium and evaporation of the liquid components occur. In this case, the liquid components and the aggregates in each ink are hard to cause solid-liquid separation, and so the self-dispersible pigment also permeates into the recording medium with the permeation of the liquid components into the recording medium. Therefore, the color developability of the secondary color image recorded with the inks satisfying Condition B alone is lower than the color developability of the secondary color image recorded with the inks satisfying Condition A alone.

From the above, when a secondary color image is recorded with two inks satisfying Condition A, solid-liquid separation is promptly caused even when the amount of the inks applied is increased. Therefore, each pigment remains on the surface of the recording medium, and so high color developability is achieved even in the secondary color image. On the other hand, when a secondary color image is recorded with two inks satisfying Condition B, the amount of liquid components on the surface of the recording medium increases as the amount of the inks applied becomes large, and solid-liquid separation is also hard to occur. Therefore, each pigment easily permeates into the recording medium, and so the color developability of the resultant secondary color image is lowered.

However, when a secondary color image is recorded with an ink satisfying Condition A and an ink satisfying Condition B, the ink satisfying Condition A promptly causes solid-liquid separation even when the amount of the inks applied is increased. Therefore, the amount of liquid components present on the surface of the recording medium becomes small compared with the case where the two inks satisfying Condition B are used. As a result, the permeation of the self-dispersible pigment in the ink satisfying Condition B through the recording medium is inhibited, and the color developability of a secondary color image recorded with inks satisfying Condition B is retained high, and a synergistic effect by the ink satisfying Condition A can be obtained.

It has been found from the above results that an ink set in which any two inks of a cyan ink, a magenta ink and a yellow ink are inks satisfying condition A, and the other ink is an ink satisfying condition B is used, whereby a secondary color image excellent in color developability can be recorded. In addition, it has been found that since aggregation of unnecessary ink is hard to occur even when a recovery operation is conducted, the occurrence of irregular ejection is inhibited. The present inventors have further found that it is favorable to provide a yellow ink high in saturation as an ink satisfying Condition B. In this case, the apparent color developability of the resulting secondary color image becomes better than the case where a cyan ink and a magenta ink are provided as inks satisfying Condition B though the optical density is not greatly changed. In addition, it is particularly favorable that the yellow ink is provided as an ink satisfying Condition B, and an anionic group contained in the functional group is a sulfonic acid group.

Ink Set:

The ink set according to the present invention is an ink jet ink set constituted of three aqueous inks of a cyan ink, a magenta ink and a yellow ink. These inks are inks of primary colors of subtractive color mixture and are mainly used upon recording of a color image, so that amounts of the inks used also become large, and frequency of a recovery operation also increases. Accordingly, any two inks of these inks satisfy condition A, and the other ink satisfies condition B, whereby aggregation of unnecessary ink is hard to occur even when the recovery operation is conducted, and so the occurrence of irregular ejection can be inhibited. In the ink set according to the present invention which is constituted of the three aqueous inks of the cyan ink, the magenta ink and the yellow ink, an ink of a hue different from that of these inks may also be used in combination. In particular, a black ink is favorably used, and the black ink is further favorably an ink satisfying Condition A. Incidentally, when what is called a special color ink having a hue different from that of the primary colors is used in combination, an image is generally recorded by using the inks of the primary colors in combination, so that it is important that the inks of the primary colors, not the special color ink, satisfy Conditions A and B. Components contained in the inks constituting the ink set according to the present invention will now be described.

Coloring Material:

The coloring material used in each ink is a self-dispersible pigment. As kinds of a pigment constituting the self-dispersible pigment, organic pigments such as azo, phthalocyanine, quinacridone, isoindolinone, imidazolone, diketopyrrolopyrrole and dioxazine pigments may be mentioned.

The pigment species of the respective inks are favorably a combination in which the cyan ink is phthalocyanine or dioxazine, the magenta ink is azo, quinacridone or diketo-pyrrolopyrrole, and the yellow ink is azo, isoindolinone or imidazolone. It is particularly favorable that the cyan ink is phthalocyanine such as C.I. Pigment Blue 15:4, the magenta ink is quinacridone such as C.I. Pigment Red 122, and the yellow ink is azo such as C.I. Pigment Yellow 74. The content (% by mass) of the coloring material in each ink is favorably 0.1% by mass or more and 10.0% by mass or less, more favorably 1.0% by mass or more and 5.0% by mass or less based on the total mass of the ink. Self-dispersible pigment of ink satisfying Condition A A self-dispersible pigment contained in an ink satisfying Condition A is a first self-dispersible pigment having a functional group that contains a phosphonic acid group and another atomic group and is bonded to a particle surface of the pigment. The first self-dispersible pigment is favorably a self-dispersible pigment having the phosphonic acid group bonded to the particle surface of the pigment through said another atomic group. The introduced amount of the functional group of the first self-dispersible pigment is favorably $4.0\times10^{-2}$ mmol/g or more. When the introduced amount of the functional group is $4.0\times10^{-2}$ mmol/g or more, reactivity to a polyvalent metal such as calcium contained in a recording medium is improved, and the pigment easily aggregates. Therefore, the color developability of an image recorded can be more improved. In addition, the introduced amount of the functional group of the first self-dispersible pigment is favorably $100.0\times10^{-2}$ mmol/g or less, more favorably $50.0\times10^{-2}$ mmol/g or less.

The ink satisfying Condition A is only required to contain the first self-dispersible pigment. In addition, another self-dispersible pigment such as a second self-dispersible pigment may be further contained. When another self-dispersible pigment is contained in the ink satisfying Condition A, the content (% by mass) of the first self-dispersible pigment is favorably 0.32 times or more in terms of mass ratio with respect to the content (% by mass) of said another self-dispersible pigment (first self-dispersible pigment/another self-dispersible pigment). When the mass ratio is 0.32 times or more, the color developability of an image recorded can be more improved because the first self-dispersible pigment is present to some extent.

Self-Dispersible Pigment of Ink Satisfying Condition B

A self-dispersible pigment contained in an ink satisfying Condition B is a second self-dispersible pigment having a functional group that contains at least one of a sulfonic acid group and a carboxylic acid group and is bonded to a particle surface of the pigment. The functional group may contain another atomic group in addition to at least one of the sulfonic acid group and the carboxylic acid group. The second self-dispersible pigment is favorably a self-dispersible pigment having at least one of the sulfonic acid group and the carboxylic acid group bonded to the particle surface of the pigment through said another atomic group. At least one of the sulfonic acid group and the carboxylic acid group is bonded to the particle surface of the pigment through said another atomic group, whereby the particle surface of the pigment can be three-dimensionally densely covered to prevent the particle surface from being exposed. Therefore, aggregation of the pigment in the unnecessary ink can be more effectively inhibited to provide an ink set more improved in reliability.

The introduced amount of the functional group of the second self-dispersible pigment is favorably $4.0\times10^{-2}$ mmol/g or more. When the introduced amount of the functional group is $4.0\times10^{-2}$ mmol/g or more, at least one water molecule can be retained in plenty as hydration water even when liquid components such as water evaporate. As a result, the self-dispersible pigment is hard to aggregate even when the liquid components such as water evaporate, whereby an ink set more improved in reliability can be provided. In addition, the introduced amount of the functional group of the second self-dispersible pigment is favorably $100.0\times10^{-2}$ mmol/g or less, more favorably $50.0\times10^{-2}$ mmol/g or less.

The second self-dispersible pigment is favorably a self-dispersible pigment having the sulfonic acid group bonded to the particle surface of the pigment through said another atomic group. The dissociation constant (pKa) of the sulfonic acid group is low compared with the carboxylic acid group. Therefore, the proportion of the sulfonic acid present as an ion is high compared with the carboxylic acid group even when the liquid components such as water evaporate, and so the water molecule can be retained in plenty as hydration water. As a result, the self-dispersible pigment is hard to aggregate even when the liquid components evaporate, so that an ink set more improved in reliability can be provided.

Acidic Group of Self-Dispersible Pigment

An acidic group contained in the functional group of the self-dispersible pigment, such as the phosphonic acid group, sulfonic acid group or carboxylic acid group, may have any form of an acid form (H form) and a salt form. When the acidic group is the salt form, it may be in any state of a partly dissociated state and an entirely dissociated state. As examples of a cation which becomes a counter ion in the case where the acidic group is the salt form, cations such as an alkali metal, ammonium and organic ammonium may be mentioned. As examples of the alkali metal, lithium, sodium and potassium may be mentioned. As examples of the organic ammonium, alkylamines having 1 to 3 carbon atoms; and alkanolamines having 1 to 4 carbon atoms may be mentioned.

Another Atomic Group of Self-Dispersible Pigment

As examples of "another atomic group" (—R—) which may be contained in the functional group of the self-dispersible pigment, there may be mentioned a linear or branched alkylene group having 1 to 12 carbon atoms; an arylene group such as phenylene group or naphthylene group; an amide group; a sulfonyl group; an amino group; a carbonyl group; an ester group; an ether group; and groups with these groups combined with each other. The functional group of the first self-dispersible pigment favorably contains, as said another atomic group (—R—), at least one of an alkylene group and an arylene group and a group having hydrogen bonding ability (for example, an amide group, sulfonyl group, amino group, carbonyl group, ester group or ether group). In particular, the functional group more favorably contains —$C_6H_4$—CONH— (benzamide structure) as said another atomic group. In addition, the functional group of the second self-dispersible pigment favorably contains a linear or branched alkylene group having 1 to 12 carbon atoms, or an arylene group such as phenylene group or naphthylene group as said another atomic group (—R—).

Introduced amount of functional group of self-dispersible pigment

"The introduced amount of the functional group" in the present specification indicates the number of millimoles of the functional group per gram of the pigment. The introduced amount of the functional group of the self-dispersible pigment can be measured in a manner described below according to the kind of the acidic group. Incidentally, a measuring method using a pigment dispersion liquid will be described below. However, the measurement can be conducted likewise by using a pigment.

When the acidic group is a sulfonic acid group or phosphonic acid group, the introduced amount of the functional group is measured by quantitatively determining the amount of sulfur or phosphorus (hereinafter referred to as "element") as described below. More specifically, a pigment dispersion liquid is first diluted with pure water in such a manner that the content of the pigment (solids) is about 0.03% by mass, thereby preparing Liquid A. The pigment dispersion liquid is then centrifuged under conditions of 5° C., 80,000 rpm and 15 hours to collect a supernatant liquid from which the pigment has been removed, and this liquid is diluted by about 80 times with pure water to prepare Liquid B. The thus-prepared Liquids A and B are subjected to quantitative element determination by, for example, an ICP Optical Emission Spectrometer. The amount of the acidic group is calculated from the difference in the amount of the element between Liquids A and B which is found from the measured values as to Liquids A and B. The amount of the functional group introduced into the pigment can be calculated by (Amount of acidic group)/n (n denotes the number of acidic groups contained in one functional group; n is 1 (mono), 2 (bis) or 3 (tris)). If the number of acidic groups contained in the functional group is unknown, the number can be specified by analyzing the structure thereof by NMR. Incidentally, the dissociation constant of the phosphonic acid group is "1" in a pH range of an aqueous ink generally used.

When the acidic group is a carboxylic acid group, the quantitative determination for elements cannot be conducted by the ICP emission spectral analyzer, so that the introduced amount of the functional group is measured by a colloidal titration method as described below. More specifically, the surface charge amount of the pigment in a pigment dispersion liquid is measured by colloidal titration using a potential difference, and this value is regarded as the amount of a carboxylic acid group. The amount of the functional group introduced into the pigment can be calculated by (Amount of carboxylic acid group)/n (n denotes the number of carboxylic acid groups contained in one functional group; n is 1 (mono), 2 (bis) or 3 (tris)). If the number of carboxylic acid groups contained in the functional group is unknown, the number can be specified by analyzing the structure thereof by NMR.

Aqueous Medium

An aqueous solvent that is water or a mixed solvent of water and water-soluble organic solvents may be caused to be contained in the respective inks. Deionized water or ion-exchanged water is favorably used as water. The content (% by mass) of water in the ink is favorably 50.0% by mass or more and 95.0% by mass or less based on the total mass of the ink. The content (% by mass) of the water-soluble organic solvent in the ink is favorably 3.0% by mass or more and 50.0% by mass or less based on the total mass of the ink. Any of solvents usable in an ink jet ink, such as alcohols, (poly)alkylene glycols, glycol ethers and nitrogen-containing compounds may be used as the water-soluble organic solvent, and one or more thereof may be contained in the ink.

Other Components

The respective inks may also contain a water-soluble organic compound that is solid at ordinary temperature, such as urea or a derivative thereof, trimethylolpropane, or trimethylolethane, in addition to the above-described components. The content (% by mass) of these water-soluble organic compounds in the ink is favorably 0.1% by mass or more and 10.0% by mass or less based on the total mass of the ink. Further, various additives such as a resin, an anti-foaming agent, a surfactant, a pH adjustor, a preservative, a mildewproofing agents, an antioxidant and an anti-reducing agent may be caused to be contained in the inks, as needed, for providing an ink having desired physical properties.

Physical Properties of Ink

The viscosities of the respective inks at 25° C. are favorably 2.0 mPa·s or more and 5.0 mPa·s or less, more favorably 2.0 mPa·s or more and 4.0 mPa·s or less. The pHs of the respective inks at 25° C. are favorably 5.0 or more and 9.5 or less, more favorably 7.0 or more and 9.0 or less. The static surface tensions of the respective inks at 25° C. are favorably 25.0 mN/m or more and 45.0 mN/m or less, more favorably 30.0 mN/m or more and 40.0 mN/m or less.

In order to sufficiently develop the effect by a difference between the kinds of the self-dispersible pigments respectively contained in the respective inks to inhibit irregular ejection at a high level, the permeabilities of the cyan ink, the magenta ink and the yellow ink are favorably made even. Therefore, a difference (absolute value) at 25° C. in static surface tension between an ink having a maximum static surface tension and an ink having a minimum static surface tension among the cyan ink, the magenta ink and the yellow ink is favorably suppressed to be small to some extent. More specifically, the difference in the static surface tension is favorably 0.0 mN/m or more and 5.0 mN/m or less, more favorably 0.0 mN/m or more and 3.0 mN/m or less.

In addition, in order to achieve high-level color developability, the permeabilities of the respective inks are favorably not heightened so much. Therefore, all the static surface tensions at 25° C. of the cyan ink, the magenta ink and the yellow ink favorably fall within a range of 30.0 mN/m or more and 40.0 mN/m or less, more favorably 33.0 mN/m or more and 40.0 mN/m or less, still more favorably 35.0 mN/m or more and 40.0 mN/m or less.

Relation Between Respective Inks

The contents of the self-dispersible pigment in the respective inks favorably satisfy the following relation. Supposing that the content of the first self-dispersible pigment in at least one ink of the inks satisfying Condition A is A (% by mass), and the content of the second self-dispersible pigment in the ink satisfying Condition B is B (% by mass), the relation of $A<B$ is favorably satisfied. In this case, an ink set by which aggregation of the pigment in the unnecessary ink is more effectively inhibited, and its reliability is more improved can be provided. In addition, supposing that the content of the first self-dispersible pigment in at least one ink of the inks satisfying Condition A is $A_1$ (% by mass), the content of the first self-dispersible pigment in the other ink satisfying Condition A is $A_2$ (% by mass), and the content of the second self-dispersible pigment in the ink satisfying Condition B is $B_1$ (% by mass), the relation of $A_1<B_1<A_2$ is favorably satisfied. In this case, an ink set by which the inhibition of aggregation of the pigment in the unnecessary ink and the improvement of color developability are attained with good balance can be provided. Incidentally, the contents of the self-dispersible pigments are all values based on the total mass of the ink.

The introduced amounts of the functional group of the self-dispersible pigment in the respective inks favorably satisfy the following relation. The introduced amount (mmol/g) of the functional group of the second self-dispersible pigment in the ink satisfying Condition B is favorably higher than the introduced amount (mmol/g) of the functional group of the first self-dispersible pigment in at least one ink of the inks satisfying Condition A. In this case, an ink set by which aggregation of the pigment in the unnecessary ink is more effectively inhibited, and its reliability is more improved can be provided.

Ink Jet Recording Method:

The ink jet recording method according to the present invention is a method of recording an image on a recording medium by ejecting the respective inks contained in the above-described ink set according to the present invention from a recording head of an ink jet system. As systems for ejecting the ink, a system in which mechanical energy is applied to the ink and a system in which thermal energy is applied to the ink are mentioned. In the present invention, the system in which the thermal energy is applied to the ink to eject the ink is particularly favorably adopted. Processes of the ink jet recording method may be those publicly known except that the inks according to the present invention are used.

EXAMPLES

The present invention will hereinafter be described in more detail by the following Examples and Comparative Examples. However, the present invention is not limited to the following examples unless going beyond the gist of the present invention. Incidentally, all designations of "part" or "parts" and "%" as to amounts of components described below are based on mass unless expressly noted.

Preparation of Pigment Dispersion Liquid:

Introduced Amount of Functional Group of Self-Dispersible Pigment

A method for measuring the introduced amount of a functional group of a self-dispersible pigment is first described. The introduced amount of a functional group of a self-dispersible pigment whose acidic group is a sulfonic acid group or a phosphonic acid group was measured in the following manner. A pigment dispersion liquid was diluted with pure water in such a manner that the content of a pigment that is an object of measurement is about 0.03%, thereby preparing Liquid A. The pigment dispersion liquid was then centrifuged under conditions of 5° C., 80,000 rpm and 15 hours to collect a supernatant liquid from which the self-dispersible pigment had been removed, and this liquid was diluted by about 80 times with pure water to prepare Liquid B. The thus-prepared Liquids A and B which are samples for measurement were subjected to quantitative determination for elements (sulfur or phosphorus) by means of an ICP Optical Emission Spectrometer (trade name "SPS5100", manufactured by SII Nanotechnology Inc.). The amount of an acidic group was found from a difference in the amount of the element between Liquids A and B, and the amount of the acidic group was divided by the number of acidic groups contained in one functional group to calculate the introduced amount of the functional group.

The introduced amount of a functional group of a self-dispersible pigment whose acidic group is a carboxylic acid group was measured by colloidal titration in the following manner. A pigment dispersion liquid was subjected to potentiometric titration using an automatic potentiometric titrator (trade name "AT-510", manufactured by KYOTO ELECTRONICS MANUFACTURING CO., LTD.) in which a stream potential titration unit (PCD-500) was installed and using methyl glycol chitosan as a titrant, thereby measuring the amount of an acidic group. The amount of the acidic group was divided by the number of acidic groups contained in one functional group to calculate out an introduced amount of the functional group.

Preparation of Self-Dispersible Pigment (Diazo Coupling Method)

Twenty grams of a pigment of the kind shown in Table 1, a treating agent of the kind and the amount shown in Table 1, nitric acid equimolar to the treating agent and 200 mL of pure water were stirred for 30 minutes under conditions of room temperature and 6,000 rpm by means of a Silverson mixer to obtain a mixture. Incidentally, among treating agents shown in Table 1, "Phosphonic acid", "Carboxylic acid" and "Sulfonic acid" are ((4-aminobenzoyl-amino)-methane-1,1-diyl)bisphosphonic acid, p-aminophthalic acid and p-aminobenzenesulfonic acid, respectively. Potassium nitrite (equimolar to the treating agent) dissolved in a small amount of water was slowly added to and mixed with the resultant mixture. The temperature of the mixture reached 60° C. by the mixing of potassium nitrite. Under this state, a reaction was conducted for 1 hour. Thereafter, the pH of the mixture was adjusted to 10 with an aqueous solution of potassium hydroxide. After 30 minutes, 20 mL of pure water was added, and diafiltration was conducted with a Spectrum membrane to obtain a self-dispersible pigment. Water was added to the resultant self-dispersible pigment to obtain respective pigment dispersion liquids in which the content of the pigment was 10.0%.

TABLE 1

Preparation conditions and properties of self-dispersible pigment

| | | Treating agent [mmol] | | | Introduced amount of functional group [mmol/g] | | |
|---|---|---|---|---|---|---|---|
| | Kind of pigment | Phosphonic acid | Carboxylic acid | Sulfonic acid | Derived from phosphonic acid | Derived from Carboxylic acid | Derived from sulfonic acid |
| CPD A1 | C.I. Pigment Blue 15:4 | 2.0 | | | $5.0 \times 10^{-2}$ | | |
| CPD A2 | C.I. Pigment Blue 15:4 | 1.6 | | | $4.0 \times 10^{-2}$ | | |
| CPD A3 | C.I. Pigment Blue 15:4 | 1.2 | | | $3.0 \times 10^{-2}$ | | |
| CPD B1 | C.I. Pigment Blue 15:4 | | | 2.0 | | | $5.0 \times 10^{-2}$ |
| CPD B2 | C.I. Pigment Blue 15:4 | | 2.0 | | | $5.0 \times 10^{-2}$ | |
| CPD B3 | C.I. Pigment Blue 15:4 | | 1.6 | | | $4.0 \times 10^{-2}$ | |
| CPD B4 | C.I. Pigment Blue 15:4 | | 1.2 | | | $3.0 \times 10^{-2}$ | |
| MPD A1 | C.I. Pigment Red 122 | 5.0 | | | $5.0 \times 10^{-2}$ | | |

TABLE 1-continued

Preparation conditions and properties of self-dispersible pigment

| | Kind of pigment | Treating agent [mmol] Phosphonic acid | Carboxylic acid | Sulfonic acid | Introduced amount of functional group [mmol/g] Derived from phosphonic acid | Derived from Carboxylic acid | Derived from sulfonic acid |
|---|---|---|---|---|---|---|---|
| MPD A2 | C.I. Pigment Red 122 | 4.0 | | | $4.0 \times 10^{-2}$ | | |
| MPD A3 | C.I. Pigment Red 122 | 3.0 | | | $3.0 \times 10^{-2}$ | | |
| MPD B1 | C.I. Pigment Red 122 | | | 5.0 | | | $5.0 \times 10^{-2}$ |
| MPD B2 | C.I. Pigment Red 122 | | 5.0 | | | $5.0 \times 10^{-2}$ | |
| MPD B3 | C.I. Pigment Red 122 | | 4.0 | | | $4.0 \times 10^{-2}$ | |
| MPD B4 | C.I. Pigment Red 122 | | 3.0 | | | $3.0 \times 10^{-2}$ | |
| YPD A1 | C.I. Pigment Yellow 74 | 10.0 | | | $5.0 \times 10^{-2}$ | | |
| YPD A2 | C.I. Pigment Yellow 74 | 8.0 | | | $4.0 \times 10^{-2}$ | | |
| YPD A3 | C.I. Pigment Yellow 74 | 6.0 | | | $3.0 \times 10^{-2}$ | | |
| YPD B1 | C.I. Pigment Yellow 74 | | | 10.0 | | | $5.0 \times 10^{-2}$ |
| YPD B2 | C.I. Pigment Yellow 74 | | | 6.0 | | | $3.0 \times 10^{-2}$ |
| YPD B3 | C.I. Pigment Yellow 74 | | 10.0 | | | $5.0 \times 10^{-2}$ | |
| RPD A1 | C.I. Pigment Red 254 | 2.0 | | | $5.0 \times 10^{-2}$ | | |
| RPD B1 | C.I. Pigment Red 254 | | | 2.0 | | | $5.0 \times 10^{-2}$ |
| GPD A1 | C.I. Pigment Green 7 | 2.0 | | | $5.0 \times 10^{-2}$ | | |
| GPD B1 | C.I. Pigment Green 7 | | | 2.0 | | | $5.0 \times 10^{-2}$ |
| BPD A1 | C.I. Pigment Violet 23 | 2.0 | | | $5.0 \times 10^{-2}$ | | |
| BPD B1 | C.I. Pigment Violet 23 | | | 2.0 | | | $5.0 \times 10^{-2}$ |

In Table 1 the following abbreviations are used:
CPD: A cyan pigment dispersion liquid;
MPD: A magenta pigment dispersion liquid;
YPD: A yellow pigment dispersion liquid;
RPD: A red pigment dispersion liquid;
GPD: A green pigment dispersion liquid;
BPD: A blue pigment dispersion liquid.

Preparation of Self-Dispersible Pigment (Oxidation Treatment Method

Into a container containing 500 g of ion-exchanged water, 15.0 g of a pigment of the kind shown in Table 2 was loaded, and stirring was conducted for 30 minutes at 15,000 rpm to preliminarily wet the pigment. Thereafter, 4,485 g of ion-exchanged water was added to further conduct dispersion by a high pressure homogenizer. The resultant dispersion was then transferred to a high pressure vessel to pressurize it under a pressure of 3.0 MPa. A predetermined amount of 100 ppm ozone water was introduced into the high pressure vessel to conduct an oxidation treatment of the pigment. Thereafter, sodium hydroxide was added to adjust the pH of a liquid to 10.0, and ion-exchanged water was added to control the content of the pigment, thereby obtaining the pigment dispersion liquids. A self-dispersible pigment having a carboxylic acid group directly bonded to a particle surface of the pigment was contained in the respective pigment dispersion liquids, and the content of the pigment was 10.0%. The introduced amounts of the functional group of the respective self-dispersible pigments are shown in Table 2.

TABLE 2

Properties of self-dispersible pigment

| | Kind of pigment | Introduced amount of functional group (mmol/g) |
|---|---|---|
| Cyan pigment dispersion liquid B5 | C.I. Pigment Blue 15:4 | $3.0 \times 10^{-2}$ |
| Magenta pigment dispersion liquid B5 | C.I. Pigment Red 122 | $3.0 \times 10^{-2}$ |

TABLE 2-continued

Properties of self-dispersible pigment

| | Kind of pigment | Introduced amount of functional group (mmol/g) |
|---|---|---|
| Yellow pigment dispersion liquid B4 | C.I. Pigment Yellow 74 | $5.0 \times 10^{-2}$ |
| Yellow pigment dispersion liquid B5 | C.I. Pigment Yellow 74 | $3.0 \times 10^{-2}$ |
| Red pigment dispersion liquid B2 | C.I. Pigment Red 254 | $3.0 \times 10^{-2}$ |
| Green pigment dispersion liquid B2 | C.I. Pigment Green 7 | $3.0 \times 10^{-2}$ |
| Blue pigment dispersion liquid B2 | C.I. Pigment Violet 23 | $3.0 \times 10^{-2}$ |

Preparation of Ink:

After the components (unit: %) shown in the upper part of Tables 3-1 to 3-4 were mixed and sufficiently stirred, the resultant mixtures were filtered under pressure through a polypropylene filter (product of Pall Corporation) having a pore size of 2.5 μm to prepare respective inks. Incidentally, "Acetylenol E100" in Tables 3-1 to 3-4 is a trade name of a nonionic surfactant (ethylene oxide adduct of acetylene glycol) produced by Kawaken Fine Chemicals Co., Ltd. The static surface tension at 25° C. of each ink is shown as "Y" where it falls within a range of 33.0 mN/m or more and 40.0 mN/m or less or "N" where it does not fall within this range, in the lower part of Tables 3-1 to 3-4. The static surface tension was measured by the platinum plate method using an automatic surface tensiometer (CBVP-Z Model; manufactured by Kyowa Interface Science Co., Ltd.).

TABLE 3-1

| Composition and properties of ink | | | | | | | | | | | | |
|---|---|---|---|---|---|---|---|---|---|---|---|---|
| | Cyan ink | | | | | | | | | | | |
| | 1 | 2 | 3 | 4 | 5 | 6 | 7 | 8 | 9 | 10 | 11 | 12 |
| Cyan pigment dispersion A1 | 30.0 | 30.0 | | | 7.5 | 6.0 | | | | | | |
| Cyan pigment dispersion A2 | | | | | | | | 30.0 | | | | |
| Cyan pigment dispersion A3 | | | 30.0 | | | | | | | | | |
| Cyan pigment dispersion B1 | | | | 40.0 | 22.5 | 24.0 | 30.0 | | | | | |
| Cyan pigment dispersion B2 | | | | | | | | | 30.0 | | | |
| Cyan pigment dispersion B3 | | | | | | | | | | 30.0 | | |
| Cyan pigment dispersion B4 | | | | | | | | | | | 30.0 | |
| Cyan pigment dispersion B5 | | | | | | | | | | | | 30.0 |
| Glycerol | 15.0 | 15.0 | 15.0 | 15.0 | 15.0 | 15.0 | 15.0 | 15.0 | 15.0 | 15.0 | 15.0 | 15.0 |
| 2-Pyrrolidone | 5.0 | 5.0 | 5.0 | 5.0 | 5.0 | 5.0 | 5.0 | 5.0 | 5.0 | 5.0 | 5.0 | 5.0 |
| Acetylenol E100 | 0.4 | 0.8 | 0.8 | 0.4 | 0.8 | 0.8 | 0.8 | 0.8 | 0.8 | 0.8 | 0.8 | 0.8 |
| Water | 49.6 | 49.2 | 49.2 | 39.6 | 49.2 | 49.2 | 49.2 | 49.2 | 49.2 | 49.2 | 49.2 | 49.2 |
| Surface tension | Y | N | N | Y | N | N | N | N | N | N | N | N |
| Content of pigment (%) | 3.0 | 3.0 | 3.0 | 4.0 | 3.0 | 3.0 | 3.0 | 3.0 | 3.0 | 3.0 | 3.0 | 3.0 |

TABLE 3-2

| Composition and properties of ink | | | | | | | | | | | |
|---|---|---|---|---|---|---|---|---|---|---|---|
| | Magenta ink | | | | | | | | | | |
| | 1 | 2 | 3 | 4 | 5 | 6 | 7 | 8 | 9 | 10 | 11 |
| Magenta pigment dispersion A1 | 50.0 | 30.0 | | 50.0 | 30.0 | | | | | | |
| Magenta pigment dispersion A2 | | | | | | | 30.0 | | | | |
| Magenta pigment dispersion A3 | | | 30.0 | | | | | | | | |
| Magenta pigment dispersion B1 | | | | | | 30.0 | | | | | |
| Magenta pigment dispersion B2 | | | | | | | | 30.0 | | | |
| Magenta pigment dispersion B3 | | | | | | | | | 30.0 | | |
| Magenta pigment dispersion B4 | | | | | | | | | | 30.0 | |
| Magenta pigment dispersion B5 | | | | | | | | | | | 30.0 |
| Glycerol | 15.0 | 15.0 | 15.0 | 15.0 | 15.0 | 15.0 | 15.0 | 15.0 | 15.0 | 15.0 | 15.0 |
| 2-Pyrrolidone | 5.0 | 5.0 | 5.0 | 5.0 | 5.0 | 5.0 | 5.0 | 5.0 | 5.0 | 5.0 | 5.0 |
| Acetylenol E100 | 0.4 | 0.8 | 0.8 | 0.8 | 0.4 | 0.8 | 0.8 | 0.8 | 0.8 | 0.8 | 0.8 |
| Water | 29.6 | 49.2 | 49.2 | 29.2 | 49.6 | 49.2 | 49.2 | 49.2 | 49.2 | 49.2 | 49.2 |
| Surface tension | Y | N | N | N | Y | N | N | N | N | N | N |
| Content of pigment (%) | 5.0 | 3.0 | 3.0 | 5.0 | 3.0 | 3.0 | 3.0 | 3.0 | 3.0 | 3.0 | 3.0 |

TABLE 3-3

| Composition and properties of ink | | | | | | | | | | | | |
|---|---|---|---|---|---|---|---|---|---|---|---|---|
| | Yellow ink | | | | | | | | | | | |
| | 1 | 2 | 3 | 4 | 5 | 6 | 7 | 8 | 9 | 10 | 11 | 12 |
| Yellow pigment dispersion A1 | | | | | | 30.0 | | | 30.0 | | | |
| Yellow pigment dispersion A2 | | | | | | | | | | 30.0 | | |

TABLE 3-3-continued

| Composition and properties of ink | | | | | | | | | | | | |
|---|---|---|---|---|---|---|---|---|---|---|---|---|
| | Yellow ink | | | | | | | | | | | |
| | 1 | 2 | 3 | 4 | 5 | 6 | 7 | 8 | 9 | 10 | 11 | 12 |
| Yellow pigment dispersion A3 | | | | | | | | | | | 30.0 | |
| Yellow pigment dispersion B1 | 40.0 | | | | 30.0 | | 40.0 | 30.0 | | | | |
| Yellow pigment dispersion B2 | | | 30.0 | | | | | | | | | |
| Yellow pigment dispersion B3 | | | | 30.0 | | | | | | | | |
| Yellow pigment dispersion B4 | | 30.0 | | | | | | | | | | |
| Yellow pigment dispersion B5 | | | | | | | | | | | | 30.0 |
| Glycerol | 15.0 | 15.0 | 15.0 | 15.0 | 15.0 | 15.0 | 15.0 | 15.0 | 15.0 | 15.0 | 15.0 | 15.0 |
| 2-Pyrrolidone | 5.0 | 5.0 | 5.0 | 5.0 | 5.0 | 5.0 | 5.0 | 5.0 | 5.0 | 5.0 | 5.0 | 5.0 |
| Acetylenol E100 | 0.4 | 0.8 | 0.8 | 0.8 | 0.8 | 0.4 | 0.8 | 0.4 | 0.8 | 0.8 | 0.8 | 0.8 |
| Water | 39.6 | 49.2 | 49.2 | 49.2 | 49.2 | 49.6 | 39.2 | 49.6 | 49.2 | 49.2 | 49.2 | 49.2 |
| Surface tension | Y | N | N | N | N | Y | N | Y | N | N | N | N |
| Content of pigment (%) | 4.0 | 3.0 | 3.0 | 3.0 | 3.0 | 3.0 | 4.0 | 3.0 | 3.0 | 3.0 | 3.0 | 3.0 |

TABLE 3-4

| Composition and properties of ink | | | | | | | | | | | | |
|---|---|---|---|---|---|---|---|---|---|---|---|---|
| | Red ink | | | | Green ink | | | | Blue ink | | | |
| | 1 | 2 | 3 | 4 | 1 | 2 | 3 | 4 | 1 | 2 | 3 | 4 |
| Red pigment dispersion A1 | | 30.0 | | | | | | | | | | |
| Red pigment dispersion B1 | 30.0 | | 30.0 | | | | | | | | | |
| Red pigment dispersion B2 | | | | 30.0 | | | | | | | | |
| Green pigment dispersion A1 | | | | | | 30.0 | | | | | | |
| Green pigment dispersion B1 | | | | | 30.0 | | 30.0 | | | | | |
| Green pigment dispersion B2 | | | | | | | | 30.0 | | | | |
| Blue pigment dispersion A1 | | | | | | | | | | 30.0 | | |
| Blue pigment dispersion B1 | | | | | | | | | 30.0 | | 30.0 | |
| Blue pigment dispersion B2 | | | | | | | | | | | | 30.0 |
| Glycerol | 15.0 | 15.0 | 15.0 | 15.0 | 15.0 | 15.0 | 15.0 | 15.0 | 15.0 | 15.0 | 15.0 | 15.0 |
| 2-Pyrrolidone | 5.0 | 5.0 | 5.0 | 5.0 | 5.0 | 5.0 | 5.0 | 5.0 | 5.0 | 5.0 | 5.0 | 5.0 |
| Acetylenol E100 | 0.4 | 0.8 | 0.8 | 0.8 | 0.4 | 0.8 | 0.8 | 0.8 | 0.4 | 0.8 | 0.8 | 0.8 |
| Water | 49.6 | 49.2 | 49.2 | 49.2 | 49.6 | 49.2 | 49.2 | 49.2 | 49.6 | 49.2 | 49.2 | 49.2 |
| Surface tension | Y | N | N | N | Y | N | N | N | Y | N | N | N |
| Content of pigment (%) | 3.0 | 3.0 | 3.0 | 3.0 | 3.0 | 3.0 | 3.0 | 3.0 | 3.0 | 3.0 | 3.0 | 3.0 |

Evaluation

The cyan, magenta and yellow inks shown in Table 4 were combined to prepare ink sets, thereby making the following evaluations. In the present invention, in the evaluation criteria of the following respective evaluation items, "AAAA", "AAA", "AA", "A" and "B" were regarded as an allowable level, and "C" was regarded as an unallowable level.

Color Developability

Ink cartridges filled with the respective inks were respectively set in cyan, magenta and yellow positions of an ink jet recording apparatus (trade name "PIXUS 850i", manufactured by Canon Inc.) in which a recording head from which an ink is ejected by thermal energy has been installed. Even when other inks were used in combination in addition to the three inks of cyan, magenta and yellow, an image was evaluated by using the three inks of cyan, magenta and yellow which are necessary for recording an image. In this embodiment, the condition where two ink droplets (the mass of each droplet being 5.0 ng) are applied to a unit region of 1/600 inch×1/600 inch is defined as "recording duty being 100%". Solid images (2 cm×2 cm/line) of cyan, magenta and yellow whose recording duty was 80% were recorded on the following two recording media (plain paper). With respect to a secondary color image, the respective inks were combined with a recording duty of 80% in such a manner that the total recording duty is 160%, thereby recording solid images (2 cm×2 cm/line) of red, green and blue. As the recording media, "GF-500" (trade name, product of Canon Inc.) and "Bright White Ink Jet Paper" (trade name, product of Hewlett Packard Co.) were used. After a day elapsed from the recording, a spectrophotometer (trade name "Spectrolino", manufactured by Gretag Macbeth Co.) was used to measure reflection densities of the respective solid images. Regarding the respective solid images of cyan, magenta and yellow, the reflection density of each component was regarded as an optical density. In addition, regarding the solid image of red, the average value of reflection densities of the magenta component and the yellow component was regarded as an optical density. Regarding the solid image of green, the average value of reflection densities of the yellow component and the cyan component was regarded as an optical density. Regarding the solid image of blue, the average value of reflection densities of the cyan component and the magenta component was regarded as an optical density. The color developabilities of the respective images were evaluated according to the following evaluation criteria from the average value of the optical densities of the respective solid images on the two recording media.

AAA: The average value was 0.94 or more;

AA: The average value was 0.92 or more and less than 0.94;

A: The average value was 0.90 or more and less than 0.92;

B: The average value was 0.85 or more and less than 0.90;

C: The average value was less than 0.85.

Inhibition of Deposition

In the case of an ink set of three colors, the same ink jet recording apparatus as that used in the evaluation of color developability was used, and the respective inks were set in cyan, magenta and yellow positions to make an evaluation. When other inks were used in combination in addition to the three inks of cyan, magenta and yellow, "PIXUS MP950" (trade name, manufactured by Canon Inc.) was used, the three inks were set in cyan, magenta and yellow positions, and other inks were set in photo cyan, photo magenta and dye black positions to make an evaluation. In this embodiment, the condition where two ink droplets (the mass of each droplet being 5.0 ng) are applied to a unit region of 1/600 inch×1/600 inch is defined as "recording duty being 100%". A solid image was recorded on the whole surface of 500 sheets of A4 sized recording medium at intervals of 4 minutes in an environment of 30° C. in temperature and 10% in relative humidity in such a manner that the recording duty of each color ink is 5%. When irregular ejection was not observed, the recording was conducted on additional 500 sheets and continued to 2,000 sheets in total, thereby making an evaluation as to inhibition of deposition of the inks according to the following evaluation criteria. The results are shown in Table 4.

AAAA: Deposition of aggregates was little at a position where preliminary ejection was performed after recoding on 2,500 sheets, and irregular ejection was not observed;

AAA: Deposition of aggregates was little at a position where preliminary ejection was performed after recoding on 2,000 sheets, and irregular ejection was not observed;

AA: Deposition of aggregates was observed at a position where preliminary ejection was performed after recoding on 2,000 sheets, and irregular ejection was also observed;

A: Deposition of aggregates was observed at a position where preliminary ejection was performed after recoding on 1,500 sheets, and irregular ejection was also observed;

B: Deposition of aggregates was observed at a position where preliminary ejection was performed after recoding on 1,000 sheets, and irregular ejection was also observed;

C: Deposition of aggregates was observed at a position where preliminary ejection was performed after recoding on 500 sheets, and irregular ejection was also observed.

TABLE 4

Make up of ink set and evaluation results

| | | Inks constituting ink set | | | Inks used in combination with ink set | | | Evaluation results | |
|---|---|---|---|---|---|---|---|---|---|
| | | Cyan ink | Magenta ink | Yellow ink | Red ink | Green ink | Blue ink | Color developability | Inhibition of deposition |
| Example | 1 | 1 | 1 | 1 | — | — | — | AAA | AAAA |
| | 2 | 2 | 2 | 2 | — | — | — | B | A |
| | 3 | 2 | 2 | 3 | — | — | — | A | AA |
| | 4 | 2 | 2 | 4 | — | — | — | A | AA |
| | 5 | 3 | 3 | 5 | — | — | — | A | AA |
| | 6 | 4 | 1 | 6 | — | — | — | A | AAA |
| | 7 | 2 | 4 | 7 | — | — | — | A | AAAA |
| | 8 | 1 | 5 | 8 | — | — | — | AA | AAA |
| | 9 | 2 | 2 | 5 | — | — | — | A | AAA |
| | 10 | 5 | 2 | 5 | — | — | — | A | AAA |
| | 11 | 6 | 2 | 5 | — | — | — | A | AAA |
| | 12 | 7 | 2 | 9 | — | — | — | A | AAA |
| | 13 | 2 | 6 | 9 | — | — | — | A | AAA |
| | 14 | 7 | 7 | 10 | — | — | — | A | AAA |
| | 15 | 8 | 6 | 10 | — | — | — | A | AAA |
| | 16 | 7 | 3 | 11 | — | — | — | B | AAA |
| | 17 | 3 | 6 | 11 | — | — | — | B | AAA |
| | 18 | 9 | 3 | 11 | — | — | — | B | AA |
| | 19 | 3 | 8 | 11 | — | — | — | B | AA |
| | 20 | 10 | 3 | 11 | — | — | — | B | AA |
| | 21 | 3 | 9 | 11 | — | — | — | B | AA |
| | 22 | 11 | 3 | 11 | — | — | — | B | A |
| | 23 | 3 | 10 | 11 | — | — | — | B | A |
| | 24 | 12 | 3 | 11 | — | — | — | B | B |
| | 25 | 3 | 11 | 11 | — | — | — | B | B |

TABLE 4-continued

Make up of ink set and evaluation results

| | | Inks constituting ink set | | | Inks used in combination with ink set | | | Evaluation results | |
|---|---|---|---|---|---|---|---|---|---|
| | | Cyan ink | Magenta ink | Yellow ink | Red ink | Green ink | Blue ink | Color developability | Inhibition of deposition |
| | 26 | 1 | 1 | 1 | 1 | 1 | 1 | AAA | AAAA |
| | 27 | 2 | 2 | 5 | 2 | 2 | 2 | A | AAA |
| | 28 | 2 | 2 | 5 | 3 | 3 | 3 | A | AAA |
| Comparative Example | 1 | 3 | 3 | 11 | — | — | — | A | C |
| | 2 | 12 | 11 | 12 | — | — | — | C | AAA |
| | 3 | 3 | 11 | 12 | — | — | — | C | AAA |
| | 4 | 12 | 3 | 12 | — | — | — | C | AAA |
| | 5 | 12 | 11 | 11 | — | — | — | C | AAA |
| | 6 | 2 | 2 | 9 | 2 | 2 | 2 | A | C |
| | 7 | 7 | 6 | 5 | 3 | 3 | 3 | C | AAA |
| | 8 | 12 | 11 | 12 | 4 | 4 | 4 | C | AAA |

When the ink set of Example 9 in which the ink satisfying Condition B was used as a yellow ink high in saturation was compared with the ink sets of Examples 12 and 13 in which the inks satisfying Condition B were used as a cyan ink and a magenta ink, there was no great difference in optical density between the images recorded. However, the appearance of the secondary color image recorded with the ink set of Example 9 was better than that of the secondary color images recorded with the ink sets of Examples 12 and 13.

Incidentally, the ink set of Example 10 is an ink set using a cyan ink of which the value (first self-dispersible pigment)/(another self-dispersible pigment) (mass ratio) is 0.32 or more. On the other hand, the ink set of Example 11 is an ink set using a cyan ink of which the value (first self-dispersible pigment)/(another self-dispersible pigment) (mass ratio) is less than 0.32. When images recorded with these ink sets were compared with each other, the image recorded with the ink set of Example 10 was relatively excellent in color developability compared with the image recorded with the ink set of Example 11.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-272237, filed Dec. 27, 2013, which is hereby incorporated by reference herein in its entirety.

What is claimed is:

1. An ink jet ink set comprising three aqueous inks which are a cyan ink, a magenta ink, and a yellow ink, wherein two of the inks of the cyan ink, the magenta ink, and the yellow ink satisfy the following Condition A, and the other ink of the cyan ink, the magenta ink, and the yellow ink satisfies the following Condition B:

Condition A: an ink comprising a self-dispersible pigment having a functional group that (a) comprises a phosphonic acid group and another atomic group, and (b) is bonded to a particle surface of its pigment; and Condition B: an ink comprising a self-dispersible pigment having a functional group that (a) comprises at least one of a sulfonic acid group and a carboxylic acid group, and (b) is bonded to a particle surface of its pigment.

2. The ink set according to claim 1, wherein, in Condition B, the functional group comprises another atomic group.

3. The ink set according to claim 1, wherein, in Condition B, the introduced amount of the functional group is $4.0\times10^{-2}$ mmol/g or more.

4. The ink set according to claim 1, wherein, in Condition B, the functional group comprises a sulfonic acid group and another atomic group.

5. The ink set according to claim 1, wherein, in Condition A, the introduced amount of the functional group is $4.0\times10^{-2}$ mmol/g or more.

6. The ink set according to claim 1, wherein the yellow ink satisfies Condition B.

7. The ink set according to claim 1, wherein static surface tensions at 25° C. of the cyan ink, the magenta ink, and the yellow ink are each 33.0 mN/m or more to 40.0 mN/m or less.

8. The ink set according to claim 1, wherein the content A1 (% by mass) of the self-dispersible pigment in one of the inks satisfying Condition A, the content $A_2$ (% by mass) of the self-dispersible pigment in the other of the inks satisfying Condition A, and the content $B_1$ (% by mass) of the self-dispersible pigment in the ink satisfying Condition B satisfy a relation of $A_1<B_1<A_2$.

9. An ink jet recording method comprising recording an image on a recording medium by ejecting inks from a recording head of an ink jet system, wherein the inks are the inks constituting the ink set according to claim 1.

10. The ink set according to claim 1, wherein, in Condition A, the self-dispersible pigment has the phosphonic acid group bonded to the particle surface of its pigment through the another atomic group.

11. The ink set according to claim 1, wherein, in Condition B, the self-dispersible pigment has the at least one of the sulfonic acid group and the carboxylic acid group bonded to the particle surface of its pigment through another atomic group.

12. The ink set according to claim 1, wherein a content (% by mass) of the self-dispersible pigment in each of the inks is 0.1% by mass or more to 10.0% by mass or less based on the total mass of the respective ink.

13. The ink set according to claim 1, wherein, in Condition A, the introduced amount of the functional group is $100.00\times10^{-2}$ mmol/g or less.

14. The ink set according to claim 1, wherein, in Condition B, the introduced amount of the functional group is $100.0\times10^{-2}$ mmol/g or less.

15. The ink set according to claim 1, wherein, in Condition A, a kind of a pigment constituting the self-dispersible pigment is at least one selected from the group consisting of azo pigment, phthalocyanine pigment, quinacridone pigment, isoindolinone pigment, imidazolone pigment, dikeopyrrolopyrrole pigment, and dioxazine pigment.

16. The ink set according to claim 1, wherein, in Condition B, a kind of a pigment constituting the self-dispersible pigment is at least one selected from the group consisting of azo pigment, phthalocyanine pigment, quinacridone pigment, isoindolinone pigment, imidazolone pigment, diketopyrrolopyrrole pigment, and dioxazine pigment.

17. The ink set according to claim 1, wherein the cyan ink satisfies Condition A.

18. The ink set according to claim 1, wherein the magenta ink satisfies Condition A.

19. The ink set according to claim 1, wherein the cyan ink and the magenta ink satisfy Condition A and the yellow ink satisfies Condition B.

20. The ink set according to claim 19, wherein the self-dispersible pigment of the cyan ink is a self-dispersible pigment having the phosphonic acid group bonded to the particle surface of its pigment through the another atomic group, the self-dispersible pigment of the magenta ink is a self-dispersible pigment having the phosphonic acid group bonded to the particle surface of its pigment through the another atomic group, and the self-dispersible pigment of the yellow ink is a self-dispersible pigment having a sulfonic acid group bonded to the particle surface of its pigment through another atomic group.

* * * * *